United States Patent [19]

Simms

[11] 4,445,760

[45] May 1, 1984

[54] PAIR OF EYEGLASSES

[76] Inventor: John T. Simms, 14259 Hatteras St., Van Nuys, Calif. 91401

[21] Appl. No.: 351,755

[22] Filed: Feb. 24, 1982

[51] Int. Cl.³ .............................................. G02C 1/08
[52] U.S. Cl. ........................................ 351/95; 351/90
[58] Field of Search ................................ 351/90–102, 351/128, 86; 2/443

[56] References Cited

U.S. PATENT DOCUMENTS 4,360,252  11/1982  Solomon ............................... 351/90

*Primary Examiner*—John K. Corbin
*Assistant Examiner*—Rodney B. Bovernick
*Attorney, Agent, or Firm*—John J. Posta, Jr.

[57] ABSTRACT

An improved pair of eyeglasses is provided which comprises a pair of eyeglass lenses, and a frame having a spaced pair of openable lens holders comprising annular rims substantially around the entire periphery of the lenses and ear retainers connected to the holders. The rims each have a closable about vertical space therein so that the rims can be opened to release the lenses. A nose bridge interconnects the holders in the frame and includes a closure in the form of an about horizontal rotatable rod having ends threaded in opposite directions and releasably received through the rims and spaces to simultaneously open or close the same by rotation of the rod. In another embodiment, a pair of such horizontal rods are rotatably positioned in the bridge, one end of each rod being received in a central vertical post and the other end being threadably received through one of the rims and spaces. Thus, the spaces can be independently opened and closed by rotation of the rods. Thus, in all embodiments eyeglass lenses are held securely in place by the holders in the frame until it is desired to change lenses or the like, whereupon the closure can be opened readily to release the lenses. The eyeglasses are simple, inexpensive, durable and efficient.

6 Claims, 3 Drawing Figures

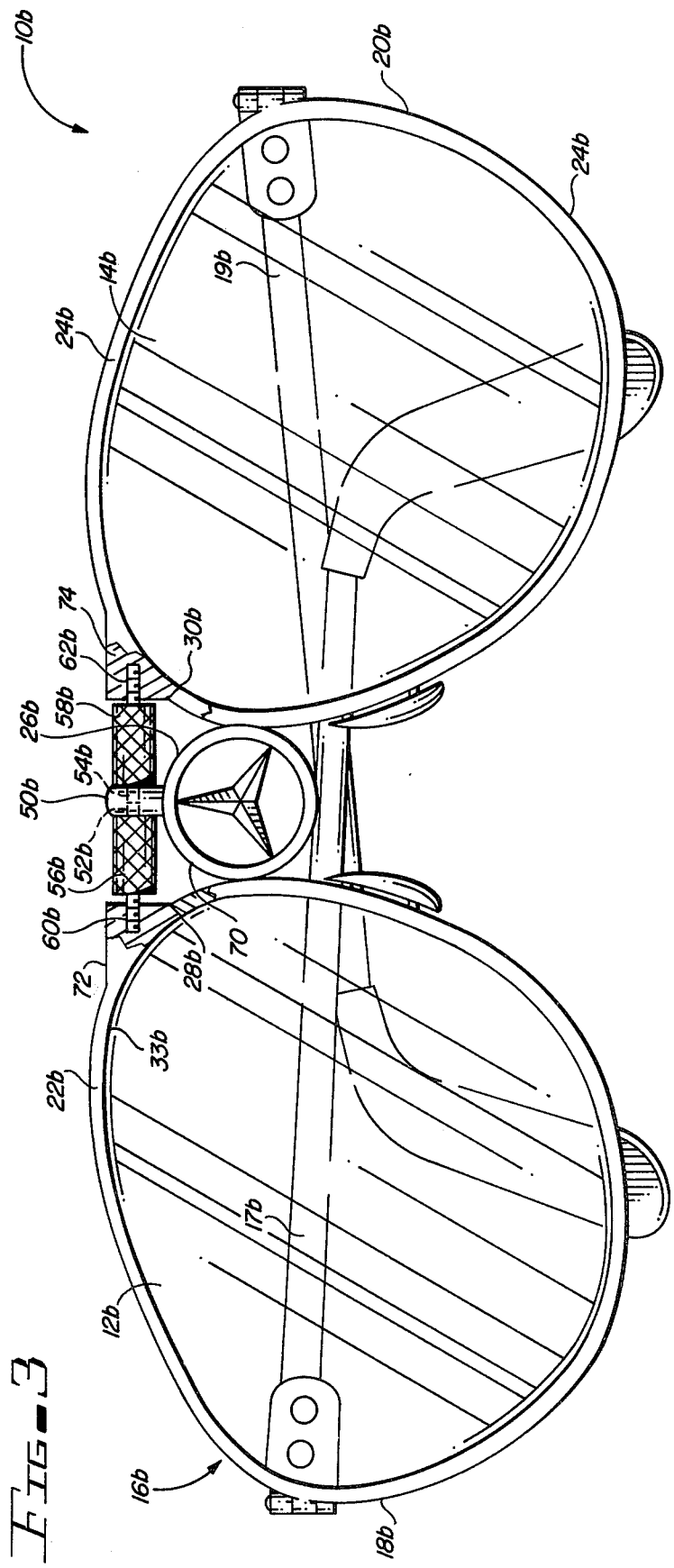
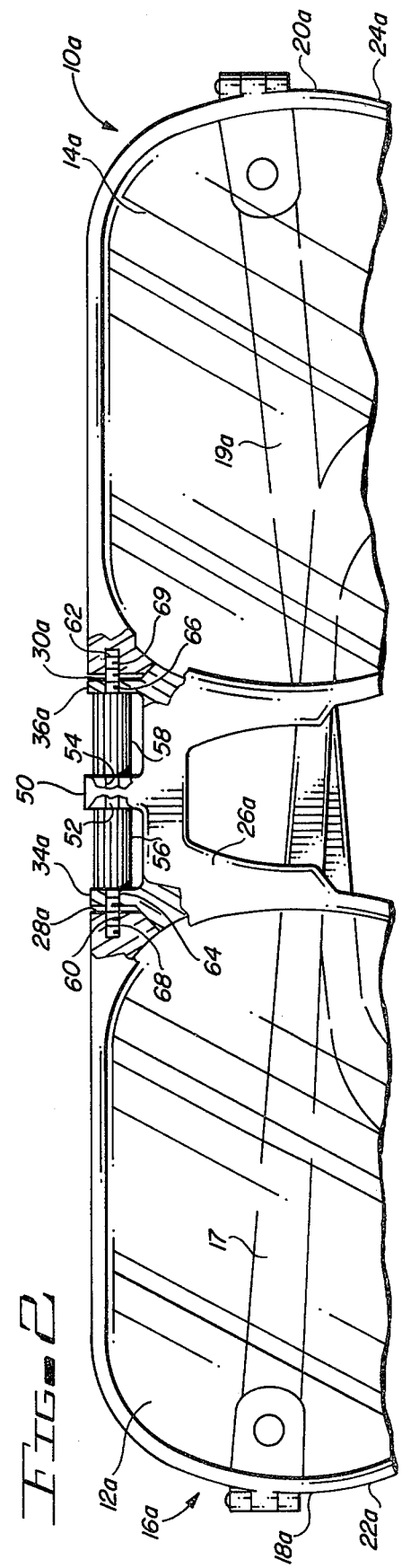

PAIR OF EYEGLASSES

BACKGROUND OF THE INVENTION

1. Field of the Invention

The present invention relates to eyeglasses and more particularly to eyeglasses having readily releasable lens holders.

2. Prior Art

Conventional one-piece plastic eyeglass frames generally require that eyeglass lenses be specially beveled so that they can be heated and snapped into place. It is quite common for such lenses to pop out of their frames, when the frames are inadvertently jarred, dropped, struck etc. usually with consequent damage to the lenses. Once a lens has popped out of the frame, it is in any event difficult for the user to reinsert it in the frame. Normally, the user must return the eyeglasses to the optometrist or optician for repair.

Metal rim-type eyeglasses usually secure the lenses in place by screwing parts of the rims together with very small screws which normally are very difficult to loosen and tighten, even if special tiny screwdrivers are available.

In order to reduce the cost of eyeglass assembly, repair and replacement it would be desirable to provide a simple, inexpensive mechanism for rapidly and easily releasing the lenses from the eyeglass frame and for reinserting them into the frame. Such mechanism would permit the switching of lenses by the user at will, for example, reading purposes with those for sun shielding purposes, or for drawing purposes, or safety shielding, etc., while utilizing the same frame.

Although several mechanism have been devised for such purposes, they are generally expensive, complicated, inefficient, bulky and unsightly. See, for example, U.S. Pat. No. 4,176,921, wherein such a mechanism is disclosed, which projects up well above the level of the frame, is complicated and may interfere with vision as well as the overall appearance of the frame. Therefore, the need remains for a simpler, more efficient device for permitting rapid efficient removal of lenses from and insertion of lenses into eyeglass frames.

SUMMARY OF THE INVENTION

The improved eyeglasses of the present invention satisfy the foregoing needs. The eyeglasses are substantially as set forth in the Abstract above. Thus, they comprise a pair of eyeglass lenses and a frame. The frame includes a pair of ear wires connected to a pair of spaced openable holders releasably holding the lenses, each holder having an annular rim gripping substantially the entire periphery of one of the lenses. Each rim has a narrow space intersecting the rim. The frame also includes a nose bridge interconnecting the holders and bearing a closure for releasably drawing the rim spaces closed to releasably lock the lenses in place in the holders. The rim spaces are usually about vertical and adjacent the bridge and each other.

In one embodiment, a horizontal rod is rotatably mounted in and spans the bridge adjacent the upper end thereof. Opposite ends of the rods are threaded in opposite directions and threadably received through the rim and spaces so that rotation of the rod in one direction closes both spaces and rotation of the rod in the opposite direction opens both spaces and releases the rims to permit changing of the lens.

In another embodiment a pair of horizontal rods are used. One end of each rods rotatably mounted in a vertical post in the bridge, while the opposite end of each rod is threadably received through the rims and said spaces. Rotation of a given rod opens and closes one of the holder rims.

Thus, lenses can be substituted in the frame at will with little effort. Broken lenses can be easily replaced and reading lenses can be changed to sun protection lenses, etc. while utilizing the same frame. The improved eyeglasses are inexpensive to make, assembly and repair and are of attractive and simple appearance. The closure rods used are situated in a normal position at the top of the nose bridge so they do not obscure vision and are attractive and of low profile. It is not necessary to use expensive components, wrenches, screwdrivers, etc. to change lenses very rapidly and accurately, using the eyeglasses of the present invention. Further features of the present invention are set forth in the following detailed description and accompanying drawings.

BRIEF DESCRIPTION OF THE DRAWINGS

FIG. 2 is a schematic front elevation, partly broken away, of a second preferred embodiment of the improved eyeglasses of the present invention; and FIG. 3 is a schematic front elevation, partly broken away, of a third preferred embodiment of the improved eyeglasses of the present invention.

DETAILED DESCRIPTION OF THE PREFERRED EMBODIMENT

FIG. 1

Figure 1:
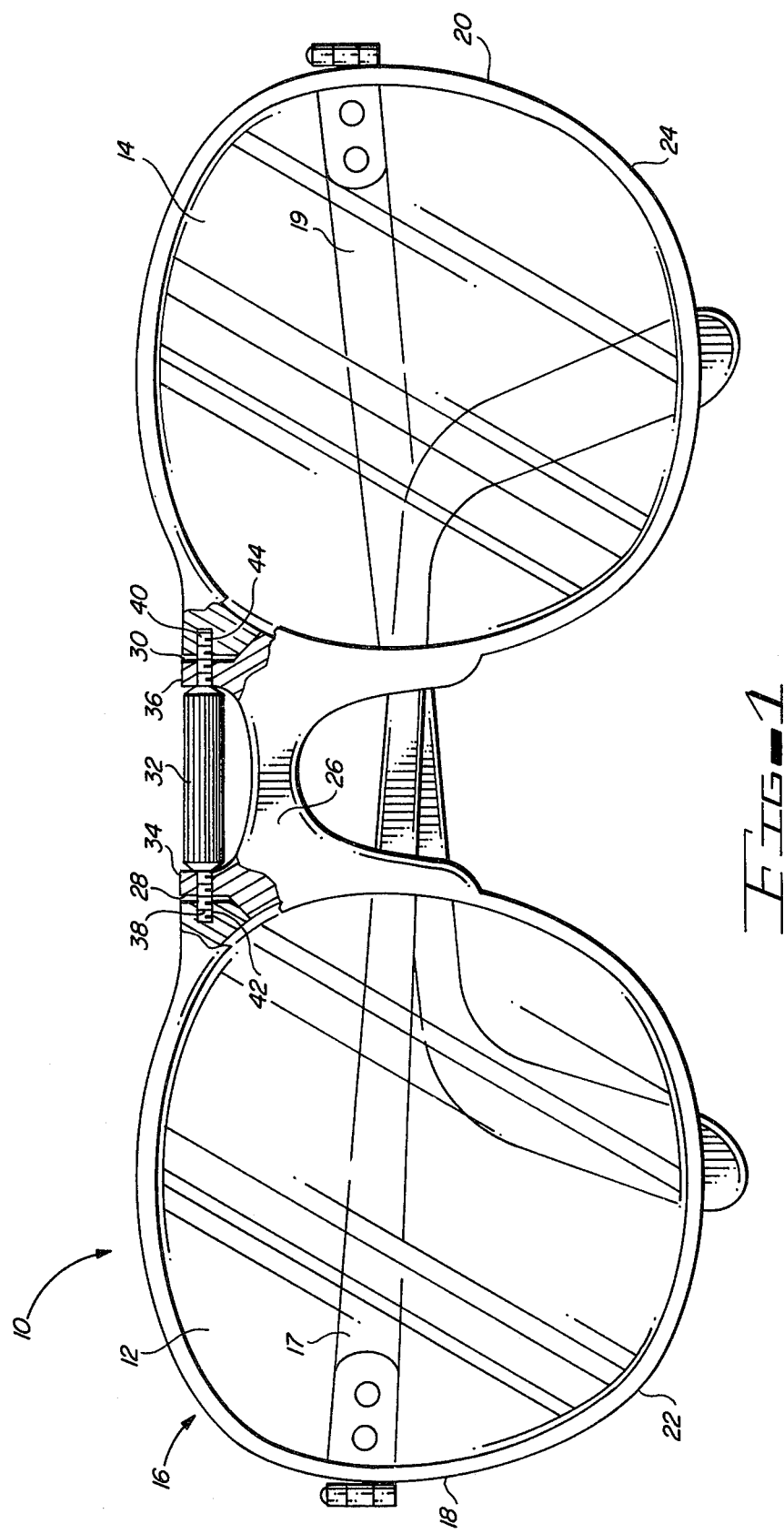
FIG. 1 is a schematic front elevation, partly broken away, of a first preferred embodiment of the improved eyeglasses of the present invention.

Now referring more particularly to FIG. 1, a first preferred embodiment of the eyeglasses of the present invention is schematically shown therein. Thus, eyeglasses 10 are depicted which comprise a pair of eyeglass lenses 12 and 14 of glass, plastic or the like, releasably secured in a frame 16. Frame 16 includes a pair of ear retainers or ear wires 17 and 19 hingedly connected to a pair of spaced eyeglass holders 18 and 20 having rims 22 and 24 encircling, gripping and securely hooding the periphery of lenses 12 and 14, as shown in FIG. 1. Rims 22 and 24 may be, for example, of metal, plastic or the like and include grooved seats (not shown) for lenses 12 and 14.

Frame 16 also includes a generally H-shaped nose bridge 26 integral with and interconnecting rims 22 and 24, and fabricated of metal, plastic or the like. Gaps or spaces 28 and 30 are provided between the upper lateral margins of bridge 26 and rims 22 and 24 so that rims 22 and 24 can be opened to release and exchange lenses 12 and 14.

Closure means are provided in frame 16 in the form of a horizontal knurled rod 32 of metal, wood, plastic, ceramic or the like rotatably mounted between the upper arms 34 and 36 of bridge 36 to provide a low modern unobtrusive appearance. Ends 38 and 40 of rod 32 are threaded in opposite directions and threadably received through threaded horizontal passageways (not shown) in arms 34 and 36 and through aligned horizontal threaded passageways 42 and 44 in rims 22 and 24, respectively, distal of spaces 28 and 30. Sufficient rotation of rod 32 in one direction disengages ends 38 and 40 from rims 22 and 24, so that rims 22 and 24 can be flexed open (due to spaces 28 and 30) sufficiently to remove lenses 12 and 14 therefrom. Rotation of rod 32 in the opposite direction draws rim 28 and 30 towards the upper lateral surfaces of arms 34 and 36 and releasably locks spaces 28 and 30 closed to hold lenses 12 and 14 securely in place in holders 18 and 20.

Accordingly, glasses 10 are of improved function, since they permit the easy and rapid substitution of lenses 12 and 14 for other lenses for purposes of repair, replacement, substitution, etc. The rim closure means is very simple, inexpensive, durable easy to manipulate, small in size and very attractive so that the clean modern appearance of glasses 10 is preserved for optimal appeal.

FIG. 2

A second preferred embodiment of the improved eyeglasses of the present invention is schematically shown in FIG. 2. Components similar to those of FIG. 1 bear the same numerals but are succeeded by the letter "a". Thus, eyeglasses 10a are shown which comprise lenses 12a and 14a, and frame 16a with ear wires 17a and 19a and lens holders 18a and 20a containing rims 22a and 24a, as well as H-shaped bridge 26a integral with rims 22a and 24a. The upper lateral margins of bridge arms 34a and 36a are separated from rims 22a and 24a by spaces 28a and 30a.

The only difference between glasses 10a and glasses 10 is that bridge 26a has a centered vertical post 50 rising from the rung of bridge 26a, to which post 50 are rotatably journaled the medial ends 52 and 54 of horizontal knurled rods 56 and 58. The lateral ends 60 and 62 of rods 56 and 58 are threaded through horizontal passageways 64 and 66 in arms 34a and 36a aligned passageways 68 and 69 in rims 22a and 24a, the latter after passing through spaces 28a and 30a, as shown in FIG. 2.

With the described arrangement of components, rotation of rod 56 in one direction opens space 28a and detaches rim 22a from end 60 of rod 56, while rotation of rod 56 in the opposite direction draws rim 22a against arm 34a to close space 28a and lock lens 12a in place in rim 22a. Similarly, rotation of rod 58 in a given direction will open or close space 30a and detach rim 24a from arm 36a or lock lens 14a in place. Thus, glasses 10a have essentially the same features as glasses 10, except that the two closure means for glasses 10a operate independently of each other with respect to the associated rims, rather than simultaneously, as in glasses 10.

FIG. 3

A third preferred embodiment of the improved eyeglasses of the present invention is schematically depicted in FIG. 3. Components thereof similar to those of FIG. 2 bear the same numerals but are succeeded by the letter "b". Thus, glasses 10b are shown in FIG. 3 and comprise lenses 12b and 14b and frame 16b. The latter including ear wires 17b and 19b, lens holders 18b and 20b, with rims 22b and 24b, and bridge 26b, accommodating adjustable or fixed nose pads.

Bridge 26b is separate from but connected to rims 22b and 24b and includes a ring 70 bearing a vertical post 50b to which are rotatably journaled the vertical post 52b and 54b of horizontal knurled rods 56b and 58b. The lateral ends 60b and 62b of rods 56b and 58b are threaded and threadably received in horizontal aligned fittings 72 and 74 secured to rims 22b and 24b just distal of about vertical spaces 28b and 30b intersecting rims 22b and 24b, as shown in FIG. 3.

Rotation of, for example, rod 56b sufficiently in one direction separates end 60b from fitting 72 so that rim 22b can be flexed open to remove lens 12b. Rotation of rod 56b in the opposite direction closes space 28b to lock lens 12b in place in holder 18b. Rod 58b performs similar functions with respect to rim 24b. Accordingly, glasses 10b have the same function and advantages as glasses 10a, although bridge 26b is not integral with rims 33b and 24b, and may be fixed with movable nose pads. Various other modifications, changes, alterations and additions can be made in the improved eyeglasses of the present invention, their components and parameters. All such changes, modifications, alterations and additions as are within the scope of the appended claims form part of the present invention.

What is claimed is:

1. An improved pair of eye glasses, said eyeglasses comprising, in combination:
    (a) a first eyeglass lens,
    (b) a first openable holder releasably holding said first lens,
    (c) a second eyeglass lens,
    (d) a second openable holder releasably holding said second lens,
    (e) said first and second holders comprising a first annular openable rim and a second annular openable rim, respectively gripping substantially the entire periphery of said respective first and second lens,
    (f) said first rim defining a first space intersecting said first rim,
    (g) said second rim defining a second space intersecting said second rim,
    (h) a nose bridge interconnecting said first and second holders and including closure means extending horizontally between and interconnecting said holders for closing said first and second spaces to releasably lock said first lens in said first holder and said second lens in said second holder, and
    (i) a pair of ear retainers secured to said holders.

2. The improved eyeglasses of claim 1 wherein said closure means comprises a rotatable rod having threaded opposite ends spanning said bridge and spaces and threadably releasably secured in both said rims, said spaces being oriented such that rotation of said threaded ends in one directin closes said spaces to lock said lenses in place and rotation of said threaded ends in the opposite direction opens said spaces to permit removal of said lenses.

3. The improved eyeglasses of claim 1 wherein said closure means is about horizontal, and wherein said spaces are adjacent to said bridge and are other than horizontal.

4. The improved eyeglasses of claim 3 wherein said ends are threaded in opposite directions, wherein upon rotation of said rod in a first direction both said spaces open to open said spaces and wherein upon rotation of said rod in the opposite direction both said spaces close.

5. The improved eyeglasses of claim 3 wherein said bridge includes a vertical post and wherein said rods comprises a pair of short tubular horizontal sections, adjacent ends of said sections being independently rotatably supported by said post and opposite ends of said section being threaded, whereby each said rim is independently closed or opened by rotation of the associated one of said sections in the appropriate direction.

6. The improved eyeglasses of claim 3 or claim 5 wherein said bridge includes a main generally H-shaped portion, wherein said rims are integral with said H-shaped portion, wherein said spaces are disposed between said rims and the upper lateral portions of the arms of said H-portion and wherein said threaded ends extend through said upper arms and said spaces into said rims adjacent thereto.

\* \* \* \* \*